(12) United States Patent
Schoerkhuber (10) Patent No.: US 11,781,352 B2
(45) Date of Patent: Oct. 10, 2023

(54) OVERHEAD LUGGAGE COMPARTMENT

(71) Applicant: FACC AG, Ried im Innkreis (AT)

(72) Inventor: Jakob Schoerkhuber, Geboltskirchen (AT)

(73) Assignee: FACC AG, Ried im Innkreis (AT)

( * ) Notice: Subject to any disclaimer, the term of this patent is extended or adjusted under 35 U.S.C. 154(b) by 1494 days.

(21) Appl. No.: 15/760,586

(22) PCT Filed: Sep. 16, 2016

(86) PCT No.: PCT/AT2016/060061
§ 371 (c)(1),
(2) Date: Mar. 15, 2018

(87) PCT Pub. No.: WO2017/045006
PCT Pub. Date: Mar. 23, 2017

(65) Prior Publication Data
US 2018/0258673 A1 Sep. 13, 2018

(30) Foreign Application Priority Data
Sep. 18, 2015 (AT) .............................. A 50803/2015

(51) Int. Cl.
*B01F 11/00* (2006.01)
*B01F 13/08* (2006.01)
(Continued)

(52) U.S. Cl.
CPC ............ *E05C 17/50* (2013.01); *B64D 11/003* (2013.01); *E05B 7/00* (2013.01); *Y02T 50/40* (2013.01)

(58) Field of Classification Search
CPC ....... E05C 17/50; B64D 11/003; B64D 11/00; Y02T 50/40; E05B 7/00; G05G 15/08
See application file for complete search history.

(56) References Cited

U.S. PATENT DOCUMENTS

| 8,651,548 B2* | 2/2014 | Shirase | ..................... E05F 1/10 |
| | | | 312/319.2 |
| 8,770,515 B1* | 7/2014 | Cloud | .................. B64D 11/003 |
| | | | 292/28 |

(Continued)

FOREIGN PATENT DOCUMENTS

| CN | 1886294 A | 12/2006 |
| CN | 102939241 A | 2/2013 |

(Continued)

OTHER PUBLICATIONS

China National Intellectual Property Administration, Office Action and Search Report Issued in Application No. 201680053828.0, dated Jul. 10, 2020, 18 pages.

(Continued)

*Primary Examiner* — Kristina R Fulton
*Assistant Examiner* — Thomas L Neubauer
(74) *Attorney, Agent, or Firm* — McCoy Russell LLP (57) ABSTRACT

Overhead luggage compartment for an aircraft, having an upper luggage compartment element, having a lower luggage compartment element which is movable between an open and a closed position, having a first holding device for holding the lower luggage compartment element in its closed position, and having a second holding device for holding the lower luggage compartment element in its open position, wherein an operating element is provided which is connected via a force transmission device to the second holding device to hold the lower luggage compartment element in its open position, wherein the second holding device can be switched by arrangement of the operating element from a holding position into a release position.

19 Claims, 7 Drawing Sheets

(51) Int. Cl.
*G01N 33/536* (2006.01)
*E05C 17/50* (2006.01)
*B64D 11/00* (2006.01)
*E05B 7/00* (2006.01)

(56) References Cited

U.S. PATENT DOCUMENTS

| | | | | |
|---|---|---|---|---|
| 8,876,171 B2* | 11/2014 | Schendel | ............ | E05B 53/003 |
| | | | | 292/116 |
| 10,315,768 B2* | 6/2019 | Schorkhuber | ........ | B64D 11/003 |

FOREIGN PATENT DOCUMENTS

| | | |
|---|---|---|
| DE | 4335151 A1 | 4/1995 |
| DE | 202014101793 U1 | 7/2014 |

OTHER PUBLICATIONS

International Bureau of WIPO, International Preliminary Reporton Patentability Issued in Application No. PCT/AT2016/060061, dated Mar. 20, 2018, WIPO, 5 pages.

* cited by examiner

OVERHEAD LUGGAGE COMPARTMENT

CROSS-REFERENCE TO RELATED APPLICATIONS

The present application is a U.S. National Phase of International Patent Application Serial No. PCT/AT2016/060061 entitled "OVERHEAD LUGGAGE COMPARTMENT," filed on Sep. 16, 2016. International Patent Application Serial No. PCT/AT2016/060061 claims priority to Austrian Patent Application No. A 50803/2015, filed on Sep. 18, 2015. The entire contents of each of the above-cited applications are hereby incorporated by reference in their entirety for all purposes.

TECHNICAL FIELD

The invention relates to an overhead luggage compartment for an aircraft, having an upper luggage compartment element, having a lower luggage compartment element which is movable between an open position and a closed position, having a first holding device for holding the lower luggage compartment element in its closed position and having a second holding device for holding the lower luggage compartment element in its open position.

BACKGROUND AND SUMMARY

Such luggage compartments have been known in the prior art for a long time. Such overhead luggage compartments often include a locking mechanism, by means of which the movable part of the luggage compartment can be fixed in its closed position. To facilitate closing of the luggage compartment, lifting springs may be provided. The spring force of the lifting springs is usually designed for the unloaded state of the luggage compartment. Thus, the luggage compartment will remain in its open position even if the luggage compartment was not loaded with pieces of luggage.

The DE 4335151 A1 discloses a luggage compartment including a tray, wherein a release plate having a lever is arranged below the tray. Upon exerting a manual force on the release plate the lever is rotated about a pivot point, thus transmitting a translatory motion onto the sheath of a Bowden cable. Upon loading the tray said translatory motion is compensated by a spring arranged on the actuating end of the traction rope of the Bowden cable. For the unloaded tray to swing up only a gas spring thus provides a lift moment resulting from the spring force and the lever arm. In the closed position, a locking hook is locked in a locking pin which is unhooked upon actuating an opener.

In the closed position, locking hooks are locked in locking pins that are mounted on the side wall. If the tray is to be opened for loading, a rod assembly is moved about the pivot point by actuating an opener with a manual force directed downwards. This unhooks the locking hook from the locking pins. Thus, the lock is opened and the tray is lowered into its loading position by its own weight.

In the opened state, the tray is in an equilibrium position which arises from the weight of the tray and the counterforce of the gas spring and automatically remains in this position. In the case of a higher payload, the front edge of the tray is at a larger distance from the horizontal fixed to the housing. The increased payload causes further compression of the gas spring. Thus, the end position of the tray is reached and a further downward movement of the tray is limited by a stop. In addition, a blocking hook is unlocked, thus releasing a supporting gas spring for the closing process.

Accordingly, the DE 4335151 A1 only refers to an embodiment in which a connection of an additional spring element (namely the supporting gas spring) depending on the loading state is provided.

From DE 4130644 A1 a luggage rack is known, which comprises a lowerable tray which is supported on stationary side walls by means of two four-bar linkages. A gas spring is provided for each four-bar linkage counteracting the weight of the tray. A weighing system is provided on both sides of the tray, consisting of a weighing lever, a spring and a weighing pin connected to the tray. During the loading process the weight of the tray is measured in this way and the gas spring is swiveled via the weighing lever such that a point of application allocated to the determined weight is assigned at the respective four-bar linkage to a guide roller via which the gas spring acts on the respective four-bar linkage.

Thus, the DE 4130644 A1 likewise refers to a prior art, in which a known weighing system is provided.

The DE 10222125 A1 and US 2003080247 A1 reveal additional luggage racks.

It is also known from WO 03/033346 A1 to equip the luggage compartment with a device to hold the container in its open position. This device is formed by a spring-mounted ball which engages in a corresponding detent recess in the open position of the container. This enables the container to be held in its open position for loading, making handling easier. In such an embodiment also stronger lifting springs could be used. However, the spring force pressing the ball into the detent recess disadvantageously must at least be large enough so as not to be overcome by the force of the lifting spring. As a result, a considerably larger operating force is required to close the luggage compartment.

Accordingly, it is the object of the present invention to eliminate or at least alleviate the disadvantages of the prior art. In particular, the invention aims to provide an overhead luggage compartment of the type mentioned above, which enables a greater support of the closing process, without essentially making it more difficult to initiate the closing process.

Said object is solved by an overhead luggage compartment for an aircraft, having an upper luggage compartment element, having a lower luggage compartment element which is movable between an open position and a closed position, having a first holding device for holding the lower luggage compartment element in its closed position, and having a second holding device for holding the lower luggage compartment element in its open position, wherein an operating element is provided which is connected via a force transmission device to the second holding device to hold the lower luggage compartment element in its open position, wherein the second holding device is switched by means of the operating element from a holding position into a release position.

According to the invention an operating element is provided, which is connected via a force transmission device to the second holding device to hold the lower luggage compartment element in its open position, wherein the second holding device can be switched by means of the operating element from a holding position to a release position.

In order to initiate the closing process, the second holding device is moved from the holding position, i. e. an active state, into the release position, i. e. an inactive state by actuating the operating element. In the release position, the holding force counteracting a movement of the lower luggage compartment element from the open position towards the closed position by the second holding device is less than in the holding position. Preferably, the operating element is located on the front side of the lower luggage compartment to facilitate operation by a user. The holding force of the second holding device in the holding position is preferably designed to keep the movable lower luggage compartment element in the open position by its own (i. e. without manual support by the user) not only in the loaded state but also in the unloaded state, i.e. without pieces of luggage in the receiving space of the luggage compartment. This embodiment makes it possible to equip the luggage compartment with a lifting spring to support the closing process, which spring is stronger as compared to the prior art. Unlike in the prior art, it is not necessary to design such a lifting spring between the upper and lower luggage compartment elements to the unloaded state of the luggage compartment to prevent accidental closing of the luggage compartment in the unloaded state of the lower luggage compartment element. On the other hand, the lower luggage compartment element can be retained in the open position against the force of the lifting spring by means of the second holding device. To initiate the closing process the second holding device is moved to the release position via the operating element. The release position of the holding device is designed to allow for smooth closing of the luggage compartment. As compared to the prior art the invention has the advantage that the holding force exerted by the second holding device in the open position does not have to be overcome, at least not exclusively, by manually moving the lower luggage compartment element toward the closed position. To initiate the closing process, the operating element is movable between a first position and a second position, to move the second holding device from the holding position to the release position by means of the force transmission device. The operating element is preferably connected to a spring in such a way that the operating element automatically returns to its first position after it has been actuated under the action of the spring. Advantageously, the movement of the operating element from the first position to the second position is different from the movement of the lower luggage compartment element. This means that, unlike in the prior art, the second holding device is actuated not only by swinging up the lower luggage compartment element. According to the invention, the second holding device can be switched to the release position independently of the movement of the lower luggage compartment element. Preferably, the holding force in the release position of the second holding device is at least several times lower than in the holding position. All that is necessary then to close the luggage compartment is to overcome the comparatively low holding force of the second holding device arranged in the release position. In this embodiment, the closing process may be carried out in two steps. First, the second holding device is moved to the release position by means of the operating element. Then, the lower luggage compartment element is moved toward the closing position by overcoming the comparatively low holding force in the release position of the second holding device. Advantageously, the release of the second holding device and the motion, in particular the pivoting of the lower luggage compartment element into the closed position can be decoupled from one another. This makes it much more convenient to operate the luggage compartment.

In accordance with a particularly preferred embodiment, the operating element is also designed for switching the first holding device from a holding position fixing the lower luggage compartment element in the closed position to a release position releasing the lower luggage compartment element. Therefore, in this embodiment the same operating element is provided for the first holding device, with which the lower luggage compartment element is held automatically in the closed position, and for the second holding device, with which the lower luggage compartment element is held automatically in the open position. Therefore, the operating element can actuate both the first and second holding devices. For this purpose, the force transmission device is connected to the first and second holding devices. The advantage of this embodiment is that the operation of the luggage compartment is particularly simple and intuitive. Furthermore, a simple construction can be provided, which is characterized by low costs and savings in weight.

To actuate the first or second holding devices it is advantageous when a handle element, in particular a pivoting handle is provided as operating element, which is connected to the second holding device via the force transmission device. Depending on the embodiment, the handle element can be moved or pivoted between the inactive and active states in order to actuate the second holding device, especially the first holding device. The handle element is preferably located on the front side of the lower luggage compartment element.

To move the second holding device from the holding position to the release position by structurally simple means it is favorable that the force transmission device has a rotating shaft connected to the pivoting handle and/or a linear element connected to the second holding device, in particular a push rod. The pivoting movement of the pivoting handle is transmitted to the rotating shaft connected to it in a rotation-proof manner, the rotating movement of which is converted into a displacement of the linear element by which the second holding device is switched from the holding position to the release position. Preferably, the rotating shaft extends in the longitudinal direction of the lower luggage compartment element, wherein the linear element is preferably arranged along the side wall of the lower luggage compartment element. In this embodiment, the rotating shaft and linear element are preferably arranged at a right angle to one another.

To convert the rotating motion of the rotating shaft into a displacement of the linear element it is favorable that the force transmission device has an operating lever connected to the rotating shaft, wherein the operating lever, in particular as of a pivot angle of more than 5°, preferably more than 10°, is arranged in a stop position on the linear element. It is particularly preferred that the displacement of the linear element is brought about only after a specified pivot angle of the operating lever has been reached. The pivot angle of the operating lever corresponds to a pivot angle of the pivoting handle. This means that the second holding device is activated only when the pivot angle has been pivoted by a certain angle. This embodiment has the particular advantage that the first holding device for the closed position of the luggage compartment can be operated independently of the second holding device, depending on the application. Furthermore, the operating force can be minimized. Finally, the operation is designed to be particularly ergonomic.

According to a preferred embodiment, the second holding device comprises a stop element, in particular a striker pin, and a hook arrangement, wherein the stop element is latched to the hook arrangement in the open position of the lower luggage compartment element. This ensures a secure locking in the open position of the luggage compartment.

The first holding device can have an additional hook arrangement which interacts with another stop element, in particular another striker pin. In the closed position, the additional hook arrangement is locked with the additional stop element.

To achieve a space-saving embodiment it is favorable to place the stop element on a side panel of the upper luggage compartment element and the hook arrangement on a side wall of the lower luggage compartment element. Alternatively, the stop element is located on the side wall of the lower luggage compartment element and the hook arrangement is located on the side panel of the upper luggage compartment element.

For locking the lower luggage compartment element in the open position, it is advantageous if the hook arrangement comprises a first hook element and a first spring, wherein the first hook element is movable, in particular pivotable, by means of the force transmission device against a first spring force of the first spring from a locking position locked with stop element into a release position releasing the stop element. Accordingly, the first hook element is biased by means of the first spring toward the locking position.

To arrange the second holding device in the release position for initiating the closing operation it is favorable if the hook arrangement has a second hook element which is arranged in the locking position of the first hook element in an inactive position releasing the stop element and in the release position of the first hook element in an active position locked with the stop element. Accordingly, the second hook element is arranged in the inactive position when the first hook element is in the locking position. Accordingly, the second hook element is present in the active position when the first hook element is arranged in the release position.

In the open position of the luggage compartment the operating element is actuated to move the first hook element into the release position and the second hook element into the active position. In the active position the second hook element exerts a second holding force on the stop element, which force is preferably lower than a first holding force exerted on the stop element by the first hook element in the locking position. This means that the first hook element is designed for secure locking of the lower luggage compartment element in the open position and the second hook element for smooth initiation of the closing process. Therefore, advantageously only the comparatively low second holding force due to the second hook element has to be overcome if the lower luggage compartment element is to be moved from the open position to the closed position.

To enable alternation between the inactive and active positions of the second hook element it is favorable to connect the second hook element to a second spring, the second hook element being biased by a second spring force of the second spring toward the active position.

The first hook element preferably has a first blocking element, by means of which the second hook element is retained in the inactive position in the locking position of the first hook element.

Accordingly, it is favorable if the second hook element comprises a second blocking element, by means of which the first hook element is retained in the active position of the second hook element in the release position. This ensures that the first and second hook elements do not engage with the stop element simultaneously.

The first blocking element of the first hook element is preferably a guide pin connected to the force transmission device, which is slidable between the locking position and the release position in a slot guide of the hook arrangement.

The second blocking element of the second hook element is preferably a retaining lug, which is engaged in the release position of the first hook element with the first blocking element of the first hook element.

To design the release position of the second holding device for a low operating force it is favorable if the first hook element has a first abutting surface and the second hook element has a second abutting surface for the stop element in the open position of the lower luggage compartment element, the second abutting surface having a flatter abutting angle than the first abutting surface. In this way, the second holding device causes a lower holding force in the release position than in the holding position, with the holding force acting against a movement of the lower luggage compartment element from the open position to the closed position due to the second holding device. Since the second abutting surface has a relatively flat design, only a minor operating force is required to disengage the stop element in the release position of the second holding device at the beginning of the closing process, which operating force can be provided by lifting up the lower luggage compartment element.

The first hook element and/or the second hook element preferably comprise(s) an additional abutting surface for the stop element when the lower luggage compartment element moves into the open position. To achieve the open position with as little force as possible the additional abutting surface has a flatter abutting angle than the first abutting surface of the first hook element or the second abutting surface of the second hook element.

During the closing process the stop element is pressed against the second abutting surface of the second hook element, so that the second hook element is deflected against the force of the second spring. By moving the stop element along the second abutting surface the second hook element is brought into the inactive position, in which the second hook element can be retained by the first blocking element of the first hook element. In addition, the first hook element is released by the second blocking element of the second hook element, so that the first hook element is switched by the first spring to the locking position. The movements of the first and second hook elements are coordinated in such a way that the stop element has already passed the first abutting surface of the first hook element when the first hook element is switched into the locking position. After unlatching at the beginning of the closing process, the first hook element is in the locking position and the second hook element is in the inactive position.

In addition, it is advantageous that the second spring force of the second spring of the hook arrangement is lower than the first spring force of the first spring of the hook arrangement. The first or second spring forces can be adjusted by the strength of the first or second spring, respectively, and/or by the position and orientation relative to the first or second hook element, respectively.

As is known in the prior art, a lifting spring may be provided between the upper luggage compartment element and the lower luggage compartment element for supporting the movement of the lower luggage compartment element from the open position into the closed position. Preferably, the lifting spring is connected to the side panel of the fixed upper luggage compartment element on the one side and to the side panel of the movable lower luggage compartment element on the other side. A lifting spring each is preferably provided on the opposite sides of the luggage compartment. It is particularly preferred that the effect of the lifting spring in the open position is greater than the opposite effect of gravity due to the dead weight of the lower luggage compartment element in its unloaded state.

In accordance with a particularly preferred embodiment of the luggage compartment, the lower luggage compartment element is pivotally arranged to the upper luggage compartment element via a joint. This enables the lower luggage compartment element to pivot between the open position in which a loading opening is released for loading the luggage compartment with pieces of luggage, and a closing position in which the loading opening is closed, about a pivot axis which is essentially fixed during the opening or closing process and extends in the longitudinal direction of the luggage compartment, i. e. in the direction of flight. However, the second holding device described above may also be used for other types of overhead luggage compartments for aircraft. For example, the second holding device may be provided in an overhead luggage compartment with a lowerable lower luggage compartment element, in which the lower luggage compartment element is not pivoted around a fixed pivoting axis, but can be moved from the upper closing position into the lower open position and vice versa.

BRIEF DESCRIPTION OF THE FIGURES

Below, the invention will be explained by using a preferred embodiment, but is not limited thereto. The drawings show as follows.

DETAILED DESCRIPTION OF FIGURES

Figure 1:
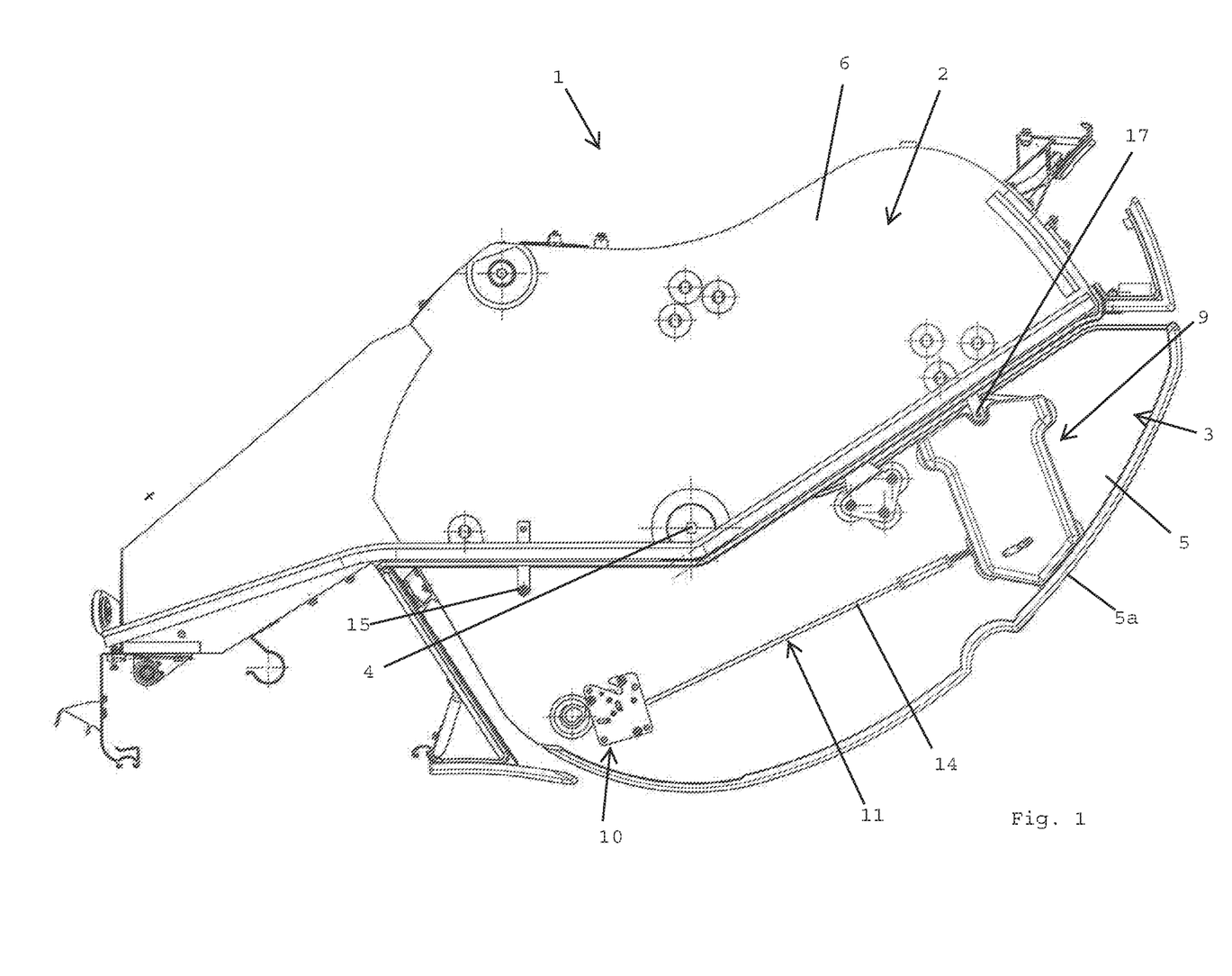
FIG. 1 shows a side view of an overhead luggage storage container according to the invention in a closed position, in which a first holding device acts between a lower luggage compartment element and an upper luggage compartment element.

FIG. 1 shows an overhead luggage compartment 1 for aircraft. The overhead luggage compartment comprises a fixed upper luggage compartment element 2 which can be attached to a structural element, in particular to a fuselage (not shown). In addition, the luggage compartment 1 comprises a movable lower luggage compartment element 3. The luggage compartment 1 has a longitudinal extension which is arranged in flight direction when installed. The movable luggage compartment element 3 is suspended on both sides of the fixed luggage compartment element 2 via hinges 4 having hinge axles. The joints 4 are located on overlapping sections of side walls 5 of the lower luggage compartment element 3 and side panels 6 of the upper luggage compartment element 2. The side walls 5 of the lower luggage compartment element 3 and the side panels 6 of the upper luggage compartment element 2 are each essentially flat or planar, with side walls 5 of the lower luggage compartment element 3 being arranged substantially in parallel to the side panels 6 of the upper luggage compartment element 2. The side walls 5 of the lower luggage compartment element 3 stand up laterally from a floor 5a, so that the lower luggage compartment element 3 is designed as a trough, half chute or U-shaped luggage compartment for accommodating pieces of luggage. The lower luggage compartment element 3 can be pivoted between an open position (cf. FIG. 2), in which a loading opening 7 is released, and a closed position (cf. FIG. 1), in which the loading opening 7 is closed. For this purpose, the lower luggage compartment element 3 comprises an operating element 8 on the front or visible side (cf. FIGS. 3, 4), the function of which will be explained in more detail below. A lifting spring 33 is provided between the upper luggage compartment element 2 and the lower luggage compartment element 3 to support the closing process. The lifting spring 33 is preferably combined with a damping element, so that the movement of the lower luggage compartment element 3 is damped.

Figure 2:
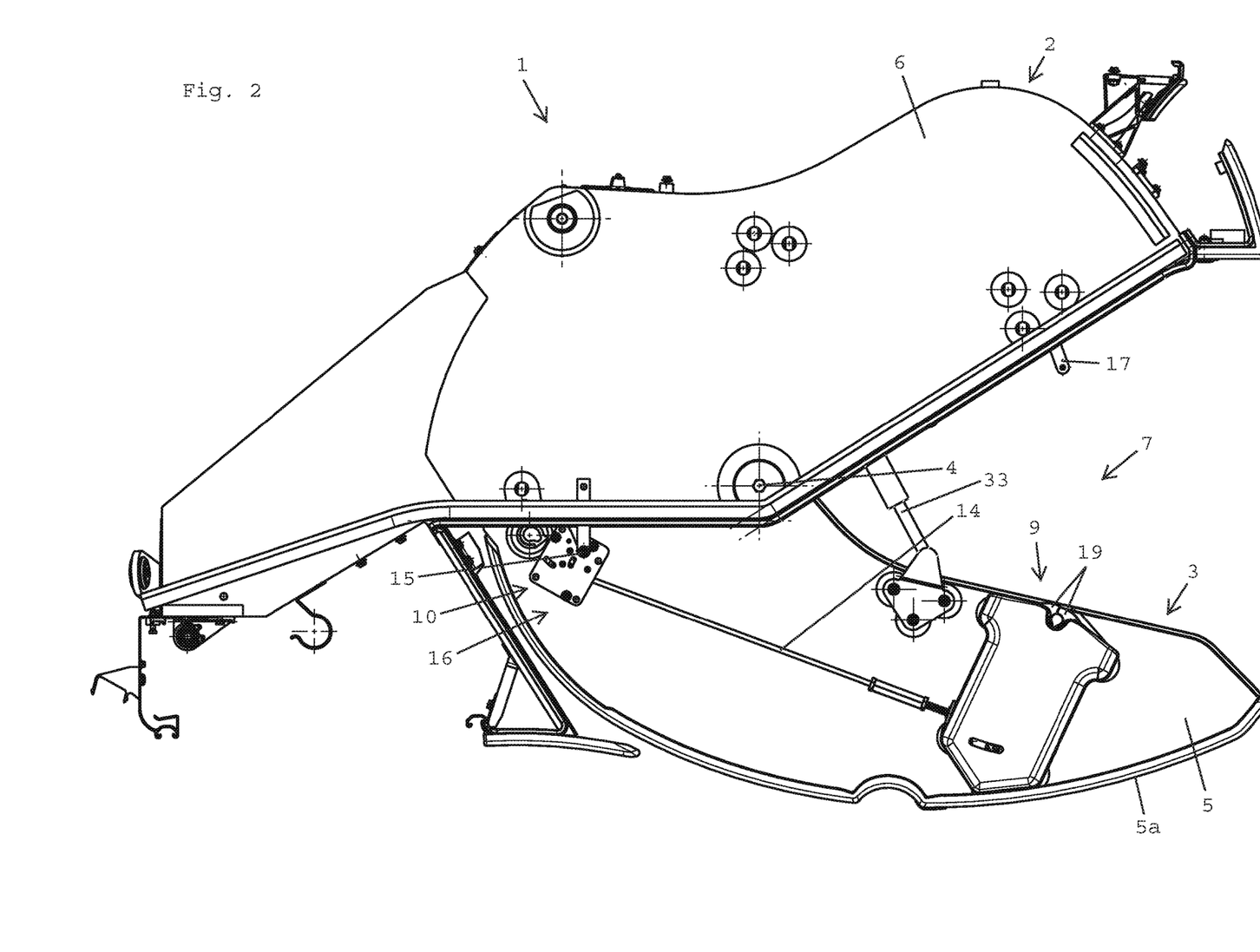
FIG. 2 shows a side view of an overhead luggage storage container according to the invention in an open position, in which a second holding device acts between the lower luggage compartment element and the upper luggage compartment element.

As is further shown in FIGS. 1, 2, the luggage compartment 1 comprises a first holding device 9 for holding the lower luggage compartment element 3 in its closed position and a second holding device 10 for holding the lower luggage compartment element 3 in its open position. The operating element 8 is provided to operate the first holding device 9 and the second holding device 10. This means that the first holding device 9 as well as the second holding device 10 can be actuated via the same operating element 8. For this purpose, the operating element 8 is adapted to actuate a force transmission device 11 which is connected to the first holding device 9. In addition, the operating element 9 is adapted for force transmission onto the second holding device 10. In the closed position of luggage compartment 1, the operating element 8 can be operated manually to switch the first holding device 9 from a holding position, in which the lower luggage compartment element 3 is automatically retained in the closed position, to a release position, in which the lower luggage compartment element 3 can be pivoted into the open position. In the open position of luggage compartment 1, the operating element 8 can be actuated to move the second holding device 10 from a holding position to a release position. In the holding position, the second holding device 10 is adapted to hold the lower luggage compartment element 3 automatically in the open position against the effect of the lifting spring 33. In the release position of the second holding device 10, the lower luggage compartment element 3 can be pivoted into the open position with a comparatively low operating force.

Figure 3:
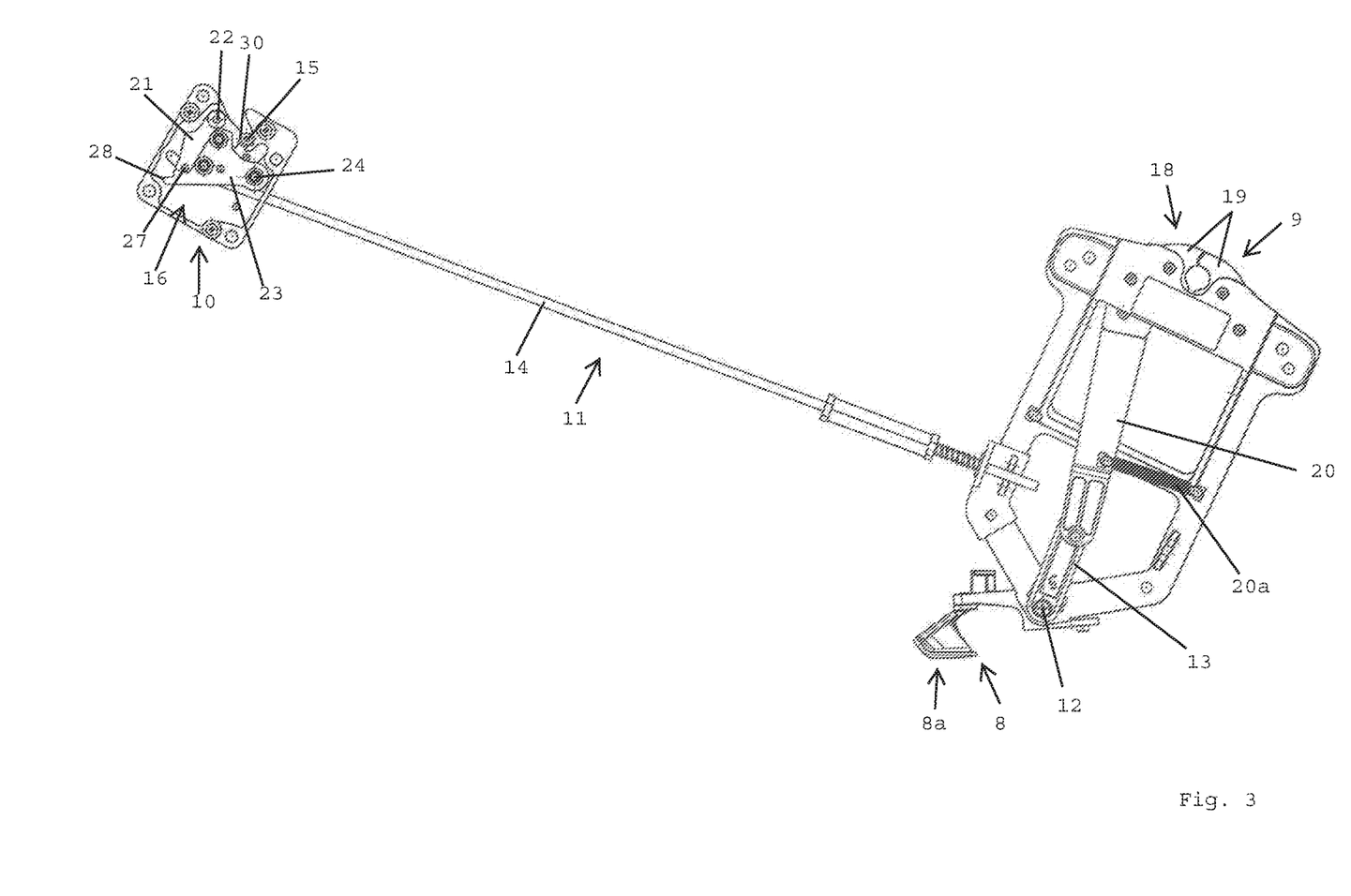
FIG. 3 shows a side view of the first and second holding devices which are connected to a handle element via a force transmission device.
Figure 4:
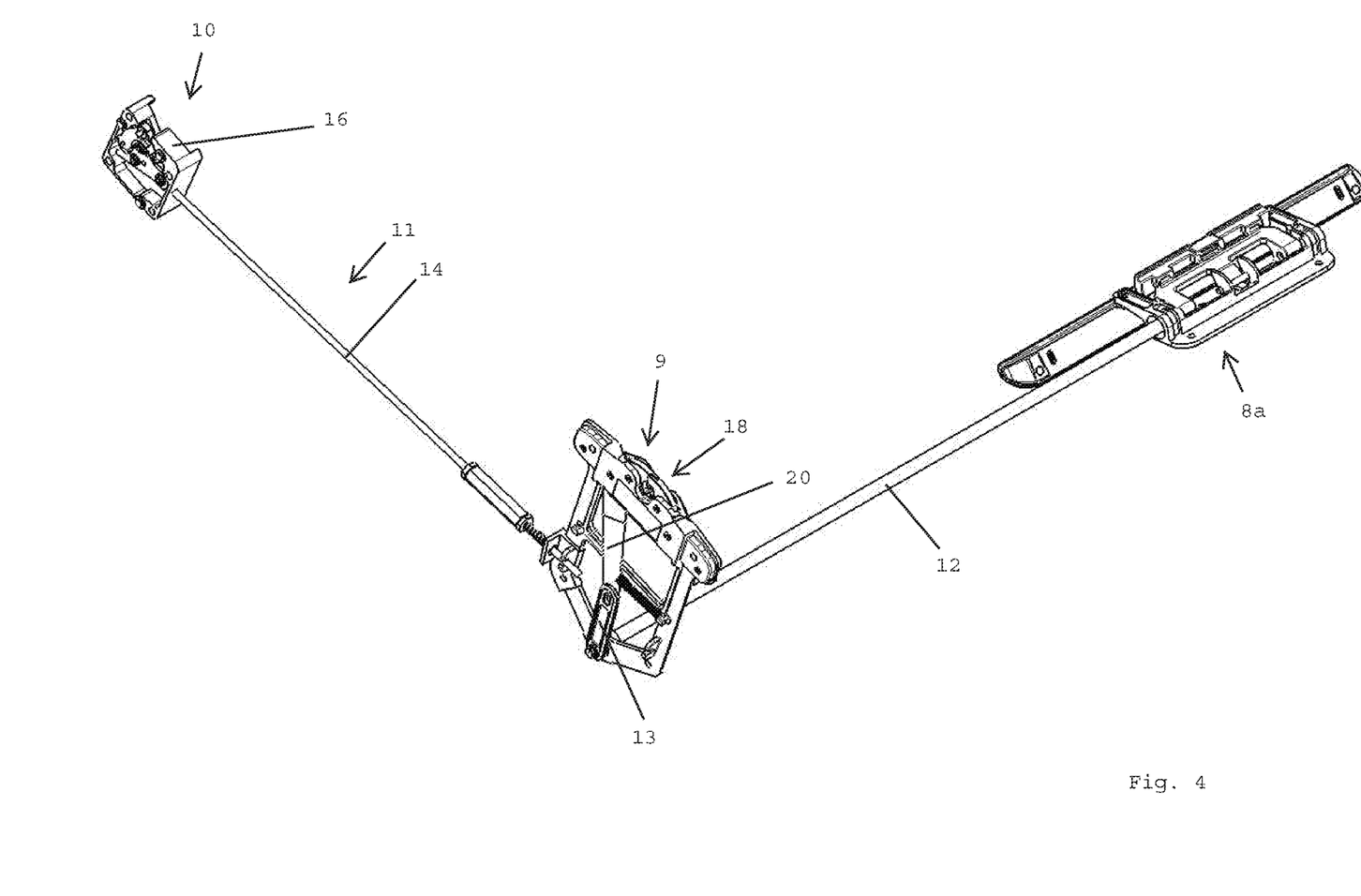
FIG. 4 shows a graphic view of the first and second holding devices, the force transmission device and the handle element according to FIG. 3, wherein a stop element arranged on the upper luggage compartment element and a hook arrangement of the second holding device arranged on the lower luggage compartment element are shown in the locked state.
Figure 5:
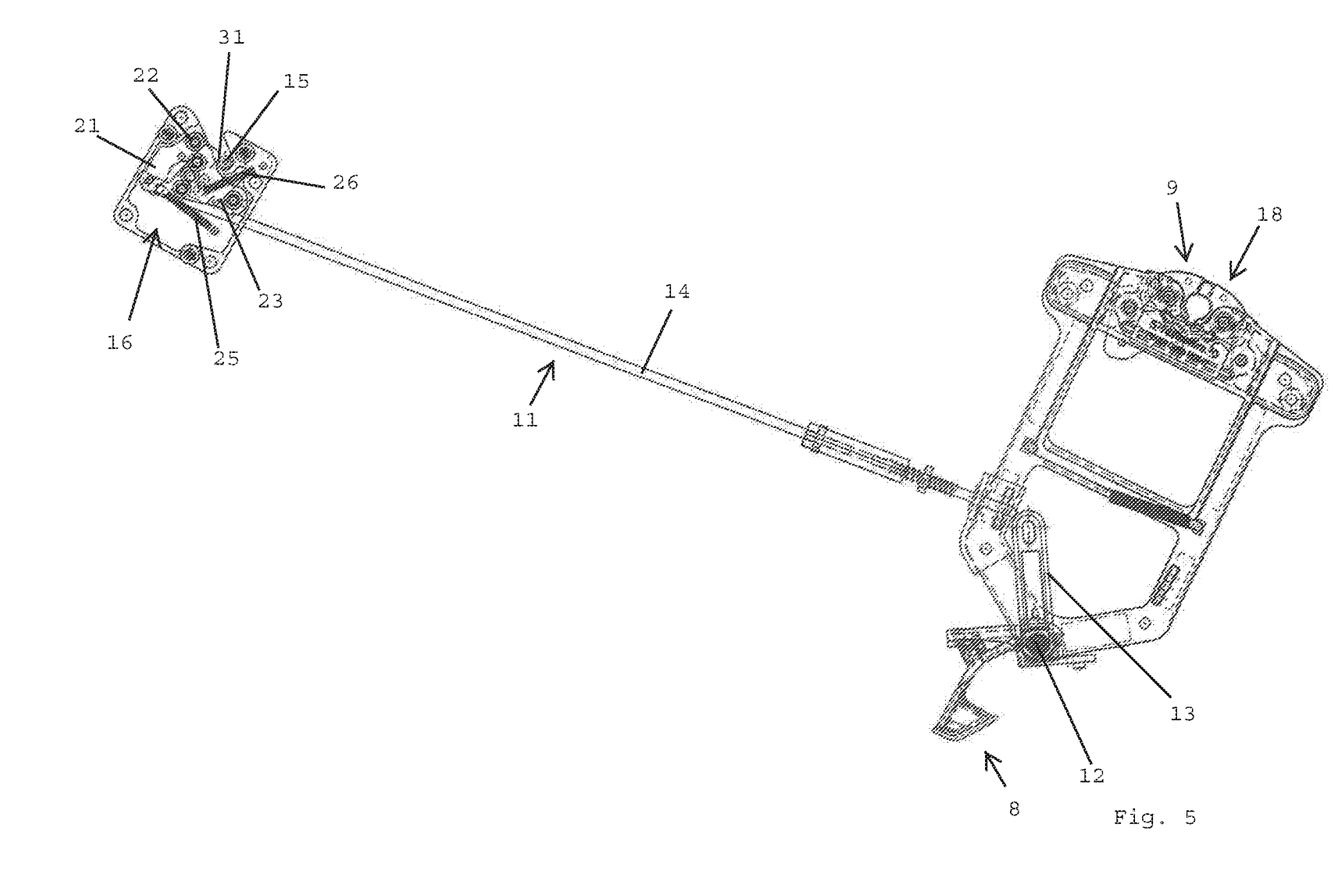
FIG. 5 shows a view according to FIG. 4, wherein the second holding device is brought into a release position by means of the force transmission device, which is configured for initiating the closing process.

As can be seen in FIGS. 2, 3, a pivoting handle 8a is provided as an operating element 8, which can be pivoted to actuate the first holding device 9 or the second holding device 10, respectively.

The force transmission device 11 has a rotating shaft 12 coupled to the pivoting handle 8a in a rotationally fixed manner, which shaft extends from the pivoting handle 8a in the longitudinal direction of luggage compartment 1 to the side wall 5 of the lower luggage compartment 3. The rotating shaft 12 is connected to an operating lever 13 in a rotationally fixed manner, with which the first holding device 9, on the one hand, and the second holding device 10, on the other hand, is actuated. The force transmission device 11 comprises a linear element 14 which can be shifted in its longitudinal direction and is formed by a push rod in the shown embodiment. The linear element 14 is connected to the second holding device 10 at one end. The other end of linear element 14 is actuated by the operating lever 13. Thus, the pivoting of the pivoting handle 8a can be converted into a rotation of the rotating shaft 12 and then into a displacement of the linear element 14. In the non-pivoted state of the pivoting handle 8a the operating lever 13 is arranged at a distance from the other end of the linear element 14. By pivoting the pivoting handle 8a and thus the operating lever 13 by a pivoting angle of more than 10°, the operating lever 13 is moved to a stop position on the linear element 14, so that the linear element 14 is moved with a continuous pivoting of the pivoting handle 8a. Preferably, the pivoting handle 8a is biased by means of a spring toward the non-pivoted position.

As can also be seen in FIGS. 1 to 5, the second holding device 10 comprises a stop element 15 which is fixed immovably to the side panel 6 of the upper luggage compartment element 2. In the shown embodiment a striker pin is provided as stop element 15. In addition, the second holding device 10 comprises a hook arrangement 16. In the open position of the lower luggage compartment element 3 the stop element 15 is locked in place with the hook arrangement 16.

As can also be seen in FIGS. 1 to 5, the first holding device 9 comprises a further stop element 17, which is fixed immovably to the bottom side of the side panel 6 of the upper luggage compartment element 2. Another striker pin is provided as further stop element 17. The first holding device 9 also comprises an additional hook arrangement 18 with two cooperating hooks 19, which are locked in the closed position with the additional stop element 17. The further hook arrangement 18 is connected via a deflection lever 20 (not shown in FIG. 5) to the operating lever 13, which is pivoted by actuating the pivoting handle 8a. The pivoting of the operating lever 13 is converted into a contra-directional pivoting of the deflection lever 20 against the force of a spring 20a, whereby the additional stop element 17 can be released by the hooks 19.

As can also be seen in FIGS. 1 to 7C, the hook arrangement 16 of the second holding device 10 comprises a first hook element 21, which can be pivoted about a first pivot axis 22. In addition, the second holding device 10 has a second hook element 23, which can be pivoted about a second pivot axis 24. The first hook element 21 is connected to a first spring 25, in particular a helical spring (cf. FIGS. 5 to 7C). By actuating the pivoting handle 8a in the open position of the lower luggage compartment element 3, the first hook element 21 can be pivoted against a first spring force of the first spring 25 from a locking position (cf. FIG. 3) engaged with the stop element 15 into a release position releasing the stop element 15 (cf. FIG. 5). The second hook element 23 is arranged in the locking position of the first hook element 21 in an inactive position releasing the stop element 15, and in the release position of the first hook element 21 in an active position engaged with the stop element 15. The second hook element 23 is connected to a second spring 26 (cf. FIGS. 5 to 7C), in particular a helical spring in such a way that the second hook element 23 is biased by a second spring force of the second spring 26 toward the active position.

As can further be seen from FIGS. 3 to 7C, the first hook element 21 comprises a first blocking element 27, with which the second hook element 23 is retained in the inactive position in the locking position of the first hook element 21. Accordingly, the second hook element 23 comprises a second blocking element 28, with which the first hook element 21 is retained in the active positioning of the second hook element 23 in the release position. A guide pin connected to the force transmission device 11 is provided as a first blocking element 27 of the first hook element 21, which is movable between the locking position and the release position in a slot guide 29 of the hook arrangement. The second hook element 23 comprises a retaining lug as a second blocking element 28, which in the release position of the first hook element 21 is engaged with the first blocking element 27 of the first hook element 21.

As shown in particular in FIGS. 3, 5, 6A to 6C, the first hook element 21 has a first abutting surface 30 and the second hook element 23 has a second abutting surface 31 (cf. FIG. 5) for the stop element 15. In the open position of the lower luggage compartment element 3 the stop element 15 is in contact with the first abutting surface 30 as long as the second holding device 10 is arranged in the holding position (cf. FIG. 6A). By actuating the operating element 8, the second holding device 10 is brought into the release position, whereby the stop element 15 is applied to the second abutting surface 31 of the second hook element 23 (cf. FIG. 6B). The second hook element 23 generates a second holding force, which is lower than the first holding force due to the first hook element 21. For this purpose, the second abutting surface 31 has a flatter abutting angle than the first abutting surface 30. In addition, the second spring force of the second spring 26 of the hook arrangement 16 is lower than the first spring force of the first spring 25 of the hook arrangement 16. When the lower luggage compartment element 3 is pivoted toward the closed position, the stop element 15 is guided by the second abutting surface 31 of the second hook element 23 (cf. FIG. 6C), which is thereby pivoted into the inactive position. This enables the pivoting of the first hook element 21. However, the first hook element 21 is only pivoted into the locking position when the stop element 15 has passed the first hook element 21.

Figure 6A:
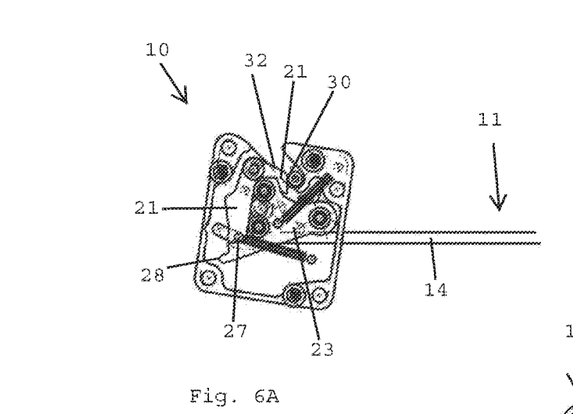
FIG. 6A shows a view of the second holding device in the holding position.
Figure 6B:
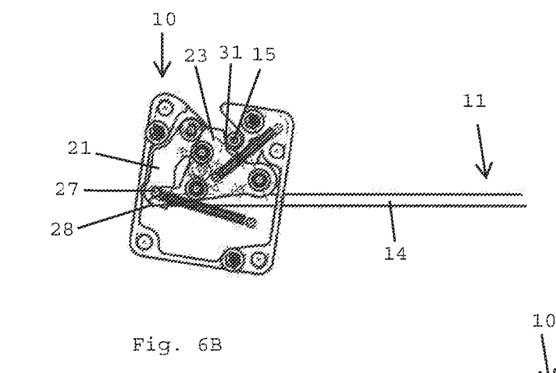
FIG. 6B shows a view of the second holding device in the release position.
Figure 6C:
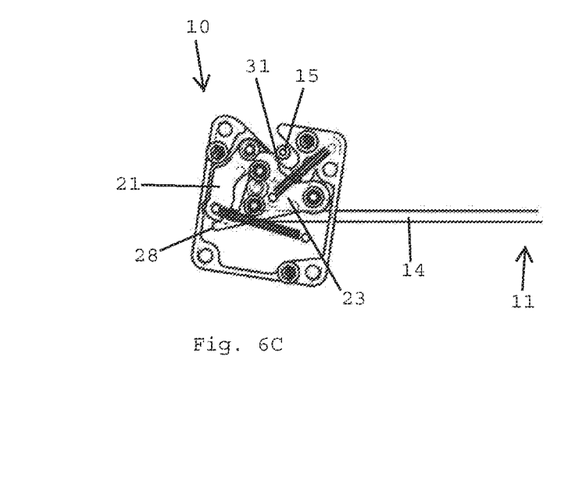
FIG. 6C shows a view of the second holding device when pivoting the lower luggage compartment element from the open position towards the closed position.
Figure 7A:
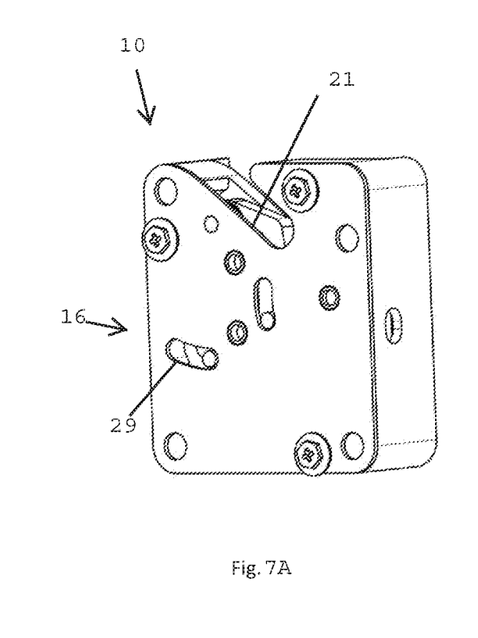
FIG. 7A to 7C show detailed views of the hook arrangement of the overhead luggage storage container according to the invention.
Figure 7B:
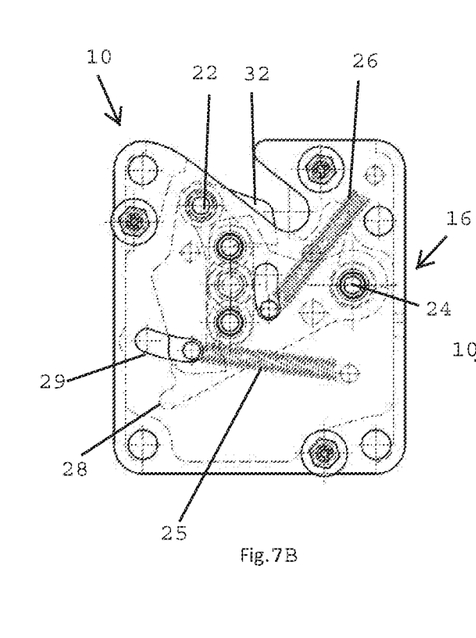
Figure 7C:
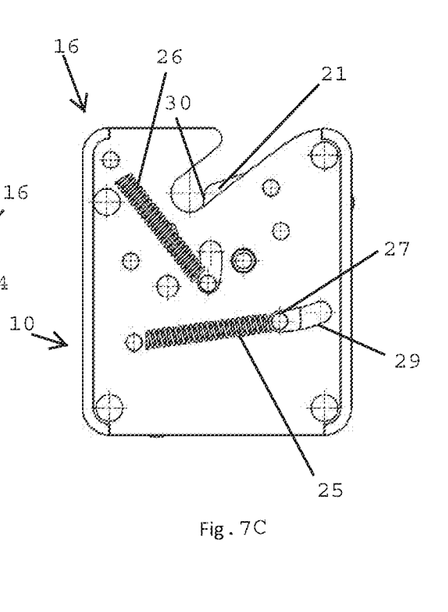

FIGS. 6A to 6C also show that the first hook element 21 comprises a further abutting surface 32 for the stop element 15. The further abutting surface 32 is effective when the luggage compartment 1 moves from the closed position to the open position. Shortly before reaching the open position of luggage compartment 1 the stop element 15 impinges on the other abutting surface 32, whereby the first hook element 21 is pivoted slightly against the force of the first spring 25 and is returned to the locking position after having passed the stop element 15. This locks the stop element 15 with the first hook element 21 so that the second holding device 10 is in the holding position.

The invention claimed is:

1. An overhead luggage compartment for an aircraft, having an upper luggage compartment element, having a lower luggage compartment element which is movable between an open position and a closed position, having a first holding device which is configured to hold the lower luggage compartment element in its closed position, and having a second holding device which is configured to hold the lower luggage compartment element in its open position, wherein an operating element is provided which is connected via a force transmission device to the second holding device to hold the lower luggage compartment element in its open position, wherein the second holding device is switched from a holding position into a release position by arrangement of the operating element, wherein the second holding device is configured to be switched to the release position independently of a movement of the lower luggage compartment element, wherein the second holding device comprises a stop element and a hook arrangement, wherein the stop element is latched to the hook arrangement in the open position of the lower luggage compartment element.

2. The overhead luggage compartment according to claim 1, wherein the operating element is further arranged for switching the first holding device from the holding position fixing the lower luggage compartment element in the closed position into the release position releasing the lower luggage compartment element.

3. The overhead luggage compartment according to claim 1, wherein as the operating element a handle element is provided, which is connected to the second holding device via the force transmission device.

4. The overhead luggage compartment according to claim 3, wherein the force transmission device comprises a rotating shaft connected to the handle element and/or a linear element connected to the second holding device.

5. The overhead luggage compartment according to claim 3, wherein the handle element is a pivoting handle.

6. The overhead luggage compartment according to claim 4, wherein the force transmission device comprises an operating lever connected to the rotating shaft, wherein the operating lever is arranged on the linear element in a stop position, in a pivoting angle of more than 5°.

7. The overhead luggage compartment according to claim 5, wherein the linear element is a push rod, and wherein the operating lever is arranged on the linear element in the stop position, in the pivoting angle of more than 10°.

8. The overhead luggage compartment according to claim 1, wherein the stop element is arranged on a side panel of the upper luggage compartment and the hook arrangement on a side wall of the lower luggage compartment or that the stop element is arranged on the side wall of the lower luggage compartment element and the hook arrangement on the side panel of the upper luggage compartment element.

9. The overhead luggage compartment according to claim 1, wherein the hook arrangement comprises a first hook element and a first spring, wherein the first hook element is movable by means of the force transmission device against a first spring force of the first spring from a locking position latched with the stop element into the release position releasing the stop element.

10. The overhead luggage compartment according to claim 9, wherein the hook arrangement comprises a second hook element which in the locking position of the first hook element is arranged in an inactive position releasing the stop element and in the release position of the first hook element in an active position latched with the stop element.

11. The overhead luggage compartment according claim 10, wherein the second hook element is connected to a second spring, wherein the second hook element is biased by a second spring force of the second spring toward the active position.

12. The overhead luggage compartment according to claim 10, wherein the first hook element comprises a first blocking element, by means of which the second hook element in the locking position of the first hook element is kept in the inactive position.

13. The overhead luggage compartment according to claim 10, wherein the second hook element comprises a second blocking element, by means of which the first hook element in the active position of the second hook element is kept in the release position.

14. The overhead luggage compartment according to claim 10, wherein as first blocking element of the first hook element a guide pin connected to the force transmission device is provided, which is movable between the locking position and the release position in a slot guide of the hook arrangement.

15. The overhead luggage compartment according to claim 10, wherein as second blocking element of the second hook element a retaining lug is provided, which in the release position of the first hook element is engaged with a first blocking element of the first hook element.

16. The overhead luggage compartment according to claim 10, wherein the first hook element comprises a first abutting surface and the second hook element comprises a second abutting surface for the stop element in the open position of the lower luggage compartment element, wherein the second abutting surface has a flatter abutting angle than the first abutting surface.

17. The overhead luggage compartment according to claim 10, wherein the second spring force of the second spring of the hook arrangement is lower than the first spring force of the first spring of the hook arrangement.

18. The overhead luggage compartment according to claim 1, wherein a lifting spring for supporting the movement of the lower luggage compartment element from the open position into the closed position is provided between the upper luggage compartment element and the lower luggage compartment element.

19. The overhead luggage compartment according to claim 1, wherein the lower luggage compartment element is arranged on the upper luggage compartment element via a joint in a pivotable manner.

\* \* \* \* \*